Nov. 9, 1943.        O. D. OVERBEY        2,333,736
CULINARY DEVICE
Filed June 2, 1941
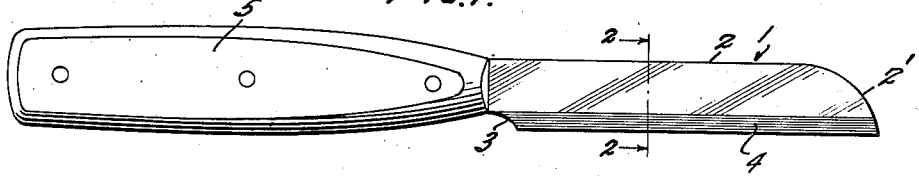
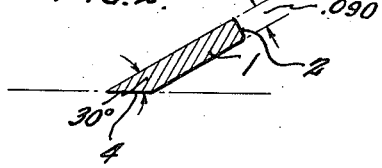
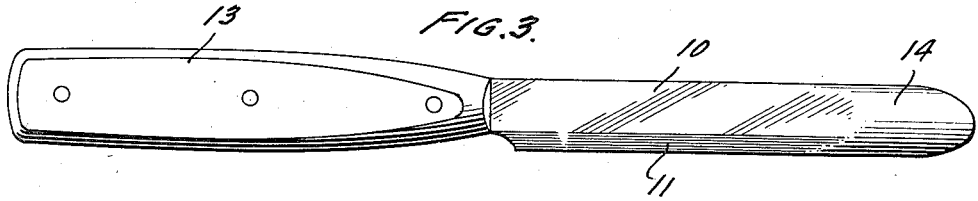
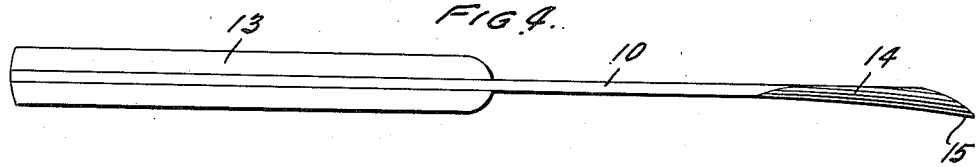
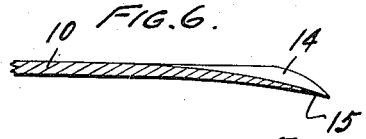 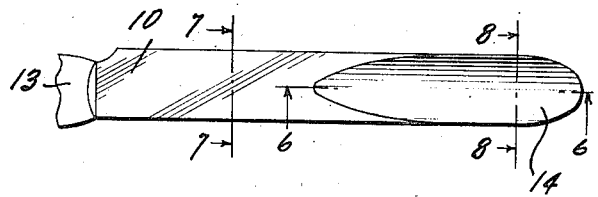
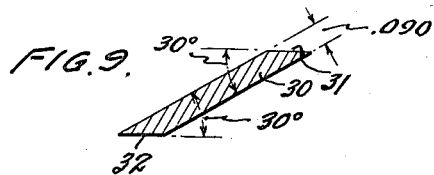
Inventor
OLA D. OVERBEY
By Semmes, Keegin, Beale & Semmes
Attorneys Patented Nov. 9, 1943

2,333,736

UNITED STATES PATENT OFFICE 2,333,736

CULINARY DEVICE

Ola D. Overbey, Bunkie, La.

Application June 2, 1941, Serial No. 396,318

2 Claims. (Cl. 30—346)

Generically, the invention set forth in this application relates to knives and specifically to knives for paring thin skinned fruits and vegetables; this application is a continuation in part of my application, Serial No. 205,314, filed April 30, 1938, entitled "Knives."

With the paring knives that are now in general use it is rather difficult to pare or peel thin skinned products without peeling too deep or taking an uneven thickness in removing the skin or peel. This is undoubtedly due to the fact that the thickness of the peeling is dependent entirely upon the skill of the user, making it extremely difficult to pare uniformly. Moreover, the knives are in no way self guiding.

Of course, it is well known that adjacent to the outer skin of fruits and vegetables, valuable mineral salts are located. Consequently, irregular or thick parings cause the commodity to lose some of its most valuable constituents.

Moreover, it will be appreciated that the coring of fruits and vegetables in numerous instances has caused undue loss of valuable parts of the product.

In devising paring knives that would overcome the above defects, I conducted numerous experiments with several types of paring knives, and my ultimate conclusion was that a paring knife provided with a blade having a certain thickness and bevel angle would afford the most desirable results. More specifically, I discovered that the efficiency of a paring knife decreases when angles either above or below a critical range are employed. Also, I found that the efficiency of a paring knife decreases when the blade thickness is either above or below a critical range. As a consequence, it is only when the bevel angle and blade thickness are correct that the blade will ride at a shallow and comparatively uniform depth below the surface of the product being pared and produce desirable results.

An object of this invention is to provide a paring knife that is simple in construction and that can be used to remove a relatively thin layer of peel from the product being pared with a minimum of waste.

Another object of this invention is to provide a paring knife having incorporated therewith an efficient coring unit.

Yet a further object of this invention is to provide a paring knife having one or more paring edges so that if one of the edges should become dulled another may be used.

And a further object of this invention is to provide a paring knife having a bevel cutting surface which also serves to guide the paring knife over the area of the product being pared.

To achieve the above and other objects, my invention embraces providing a paring knife blade with a beveled surface that forms an angle of from 26 to 33° with the blade face and having a blade of a thickness from .055 to .095 inch. In some instances the blade may have incorporated therewith a coring member for removing seed and seed cells.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawing means for carrying the same into practical effect without limiting the improvements in their useful applications to the particular constructions which, for the purpose of explanation, have been made the subject of illustration.

In the drawing:

Figure 1 is a side elevational view of a paring knife embodying my invention.

Figure 2 is a sectional view taken along the line 2—2 of Figure 1 looking in the direction of the arrows.

Figure 3 is a side elevational view of a paring knife constructed along the lines of that shown in Figure 1 but including also a coring unit at the end thereof.

Figure 4 is a top plan view of the knife shown in Figure 3.

Figure 5 is a detail view of the blade shown in Figure 3 illustrating the coring unit.

Figure 6 is a sectional view taken along the line 6—6 of Figure 5 looking in the direction of the arrows.

Figure 7 is a sectional view taken along the line 7—7 of Figure 5 looking in the direction of the arrows.

Figure 8 is a sectional view taken along the line 8—8 of Figure 5 looking in the direction of the arrows.

Figure 9 is a view in cross section showing a further modification of my paring knife wherein a double paring edge is provided.

The preferred embodiment of my inventive concept is illustrated in Figures 1 and 2 wherein I have shown a blade member 1 that is relatively thick as depicted by the numeral 2. The blade member 1 is cutaway along its lower edge as at 3 and is anchored suitably within a wooden handle or grip member 5. The end of the blade opposite to the handle is provided with a rounded surface 2' for the customary purpose.

The blade 1 is formed with a beveled surface 4 extending longitudinally along the lower edge of the blade (Figure 1). The surface 4 as shown in Figure 2 forms an angle of 30° with the blade face and the blade is preferably .090 inch in thickness.

I have discovered that a knife having the details of construction set forth is very easy to use, and of even greater importance, it enables a thinner peeling to be produced.

The bevel angle, that is, the acute angle formed at the cutting edge of the blade, determines how deep or how shallow the blade will ride, once the paring process is begun. In fact, the bevel angle fixes the depth of peeling, and it is apparent that this angle must be correct or otherwise the peeling will be either too thick, or too thin to be practical.

The blade thickness and the bevel angle are the two interdependent factors which determine the ease and sureness of the paring stroke. They determine the width of the beveled surface on which the blade rides in paring and this width fixes the ease and sureness of the paring stroke. The paring stroke is the product of two concurrent forces, the one used to propel the blade forward and the other being the upward force on the beveled surface as it is being propelled forward. It is therefore evident that any variation of either the blade thickness or the bevel angle other than that disclosed will upset the fine balance of these forces and produce undesirable results. In other words, the beveled surface functions to guide the paring edge over the area being pared, thus preventing deep cutting.

Consequently, it is only when the bevel angle and the blade thickness are within the approximate limits herein set forth that the blade will ride at a very shallow and comparatively uniform depth below the surface of the fruit or vegetable being pared.

To pare fruits and vegetables with my paring knife, the surface 4 should be placed against the surface of the product to be pared and after tipping the blade upwardly a small amount the user should then slide the blade forward as in paring whereby the sharp edge will take a position slightly below the skin or peel. The edge of the blade rides easily and smoothly below the surface of the product and the surface 4 serves as a guide in supporting the blade in this semi-upright position. Consequently, the blade rides at a sufficiently shallow depth to assist in paring a very thin peeling and this is accomplished with a light paring motion.

While holding the beveled surface flush against the product is not the only way that my paring unit can be used, I have discovered, however, that for the majority of people this is by far the easiest way to use the knife.

Not only is it possible to obtain a thinner peeling with my bevel knife construction, but the product remains more nearly in its natural state such as, for example, peaches and apples are rounder, and Irish potatoes lose but little of the valuable mineral salts that are in the thick outer layers.

While a blade having a bevel angle of 30° and a blade thickness of .090 inch is the best type of knife for paring the majority of food products, it is possible to employ a blade, the beveled surface of which makes an angle of from 26 to 33° with the blade face. I have also found that the thickness of the blade may vary from .055 inch to .095 inch without too much sacrifice in utility.

In conducting my experiments, it was determined that a paring knife having an angle greater than 33° is extremely difficult to use and cannot be kept in place for paring due to the unequality of the concurrent forces. The knife is forced out after each attempt to continue paring. Additionally, when the angle is less than 26° the blade has a tendency to cut too deeply into the product and thereby produce a very wasteful peeling. For these reasons a blade having an angle less than 26° or greater than 33° must be considered impractical for paring.

When the blade thickness is over .095 inch there is afforded a knife which is rather clumsy to use and which becomes even more cumbersome when it is desired to pare rapidly. In other words, when the blade thickness exceeds .095 inch, the knife is not particularly effective due to the increased weight and friction.

On the other hand, when the blade thickness is less than .055 inch, the knife is very difficult to use properly since the beveled surface is too narrow and there is a tendency for the blade to rock during the paring process. Obviously, with such a thin blade it is somewhat difficult to learn the proper manipulation. Also, the depth of the peeling is noticeably irregular at intervals because the beveled surface is too narrow to support the blade properly.

My paring knife, however, is quite simple in construction and operation and is very economical, particularly in paring thin skinned fruit. The angle range (26 to 33°) is most important in view of the fact that the paring efficiency decreases when angles above or below this range are utilized. While the preferred bevel angle for the majority of products is 30°, it will be appreciated that a slight deviation from this figure will not affect materially the efficiency of the knife.

Furthermore, the blade thickness is very important inasmuch as this is a necessary factor in fixing the ease and sureness of the paring stroke. While a blade having a thickness of .090 inch is probably the most desirable, this figure may vary from .055 to .095 inch.

The blade thickness and the bevel angle are two critical factors and it is only when they are correct that the blade will ride at a shallow and substantially uniform depth below the skin or peeling of the product being worked upon.

In the course of my experiments, I learned that an angle of 29 or 30° is the best for paring firmer products, such as, Irish potatoes, apples, and carrots. When paring softer products, such as, egg plants, apricots, peaches or tomatoes, an angle of 32 or 33° is much better.

In Figures 3 to 8 inclusive it will be noted that I have illustrated a paring knife similar to that shown in Figure 1 which is provided with a coring unit. The knife blade is illustrated by the numeral 10 and is provided with a bevel surface 11 corresponding to the surface 4 shown and described in connection with Figures 1 and 2. The blade 10 is fixed within a handle 13 and the opposite end is provided with a coring scoop 14. The scoop 14 is substantially crescent shaped as shown in Figure 8 and is formed with an offset tip 15. The tip 15 will enable the seed and seed cells to be removed from the core aperture by prying or gouging. This will not necessitate an increase in the size of the aperture, thereby saving edible fruit.

In the embodiment illustrated in Figure 9, I have shown a blade member 30 provided with two beveled surfaces 31 and 32. As shown, each surface makes an angle of 30° with the blade face and the blade is .090 inch in thickness. Under certain circumstances a blade of this type is desirable in that it will permit either edge of the unit to be used during the paring process.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A knife for paring thin skinned fruits and vegetables comprising an elongated flat blade of substantially .090 inch thickness, said blade being provided with a flat peel deflecting surface, a straight paring edge extending the length of a longitudinal edge thereof, and a flat blade-guiding surface extending from the paring edge to the blade face opposite the peel deflecting surface and forming with the peel deflecting surface an angle of substantially 30°, said flat blade-guiding surface adapted to engage the surface of the fruit or vegetable being pared serving thereby to inhibit rotation of the blade about its longitudinal axis during the paring operation to thereby govern the thickness of the skin being pared from the fruit or vegetable.

2. A knife for paring thin skinned fruits and vegetables comprising an elongated flat blade of a thickness between .055 inch and .095 inch, said blade being provided with a flat peel deflecting surface, a straight paring edge extending the length of a longitudinal edge thereof, and a flat blade guiding surface extending from the paring edge to the blade face opposite the peel deflecting surface and forming with the peel deflecting surface an angle between 26° and 33°, said flat blade guiding surface adapted to engage the surface of the fruit or vegetable being pared serving thereby to inhibit rotation of the blade about its longitudinal axis during the paring operation to thereby govern the thickness of the skin being pared from the fruit or vegetable.

OLA D. OVERBEY.